Jan. 5, 1965 M. GROSJEAN ETAL 3,164,662
REGISTERING SPECTRO-POLARIMETER
Filed July 13, 1960 5 Sheets-Sheet 1
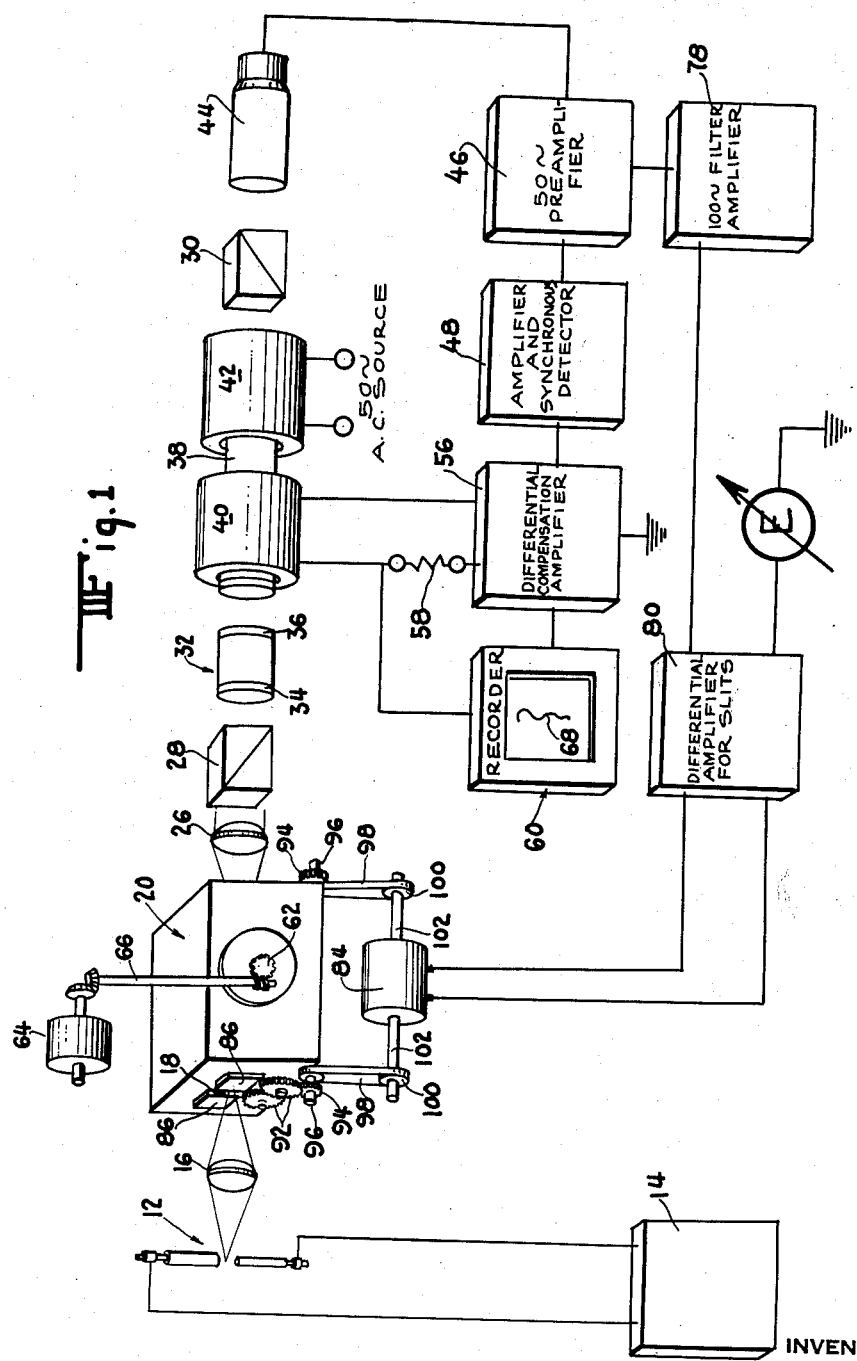
INVENTORS
MARC GROSJEAN
ANDRE LACAM
MAURICE LEGRAND

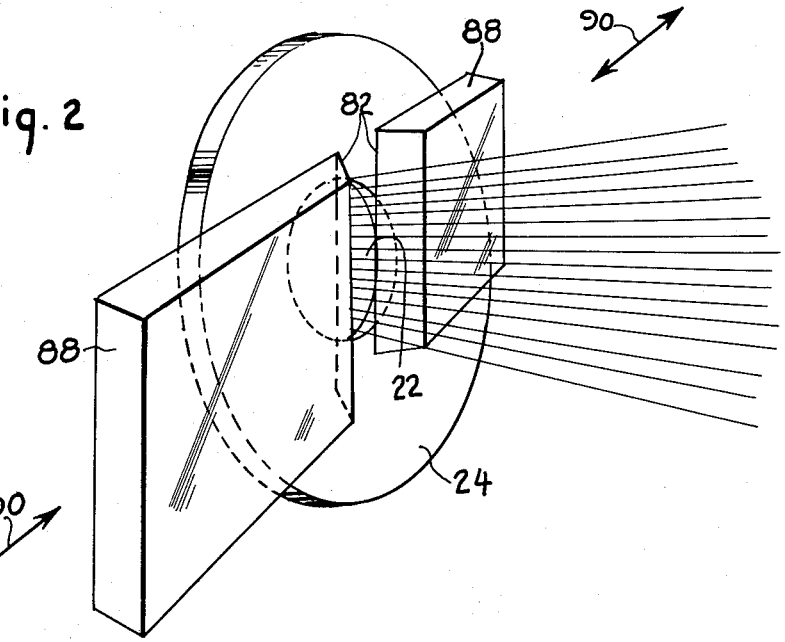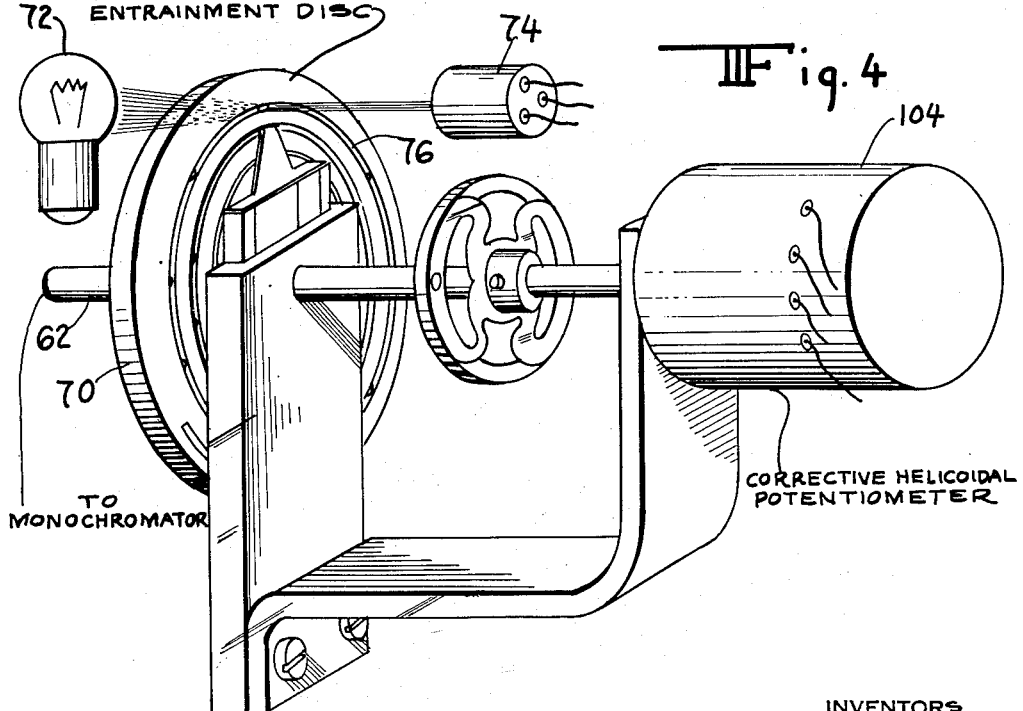

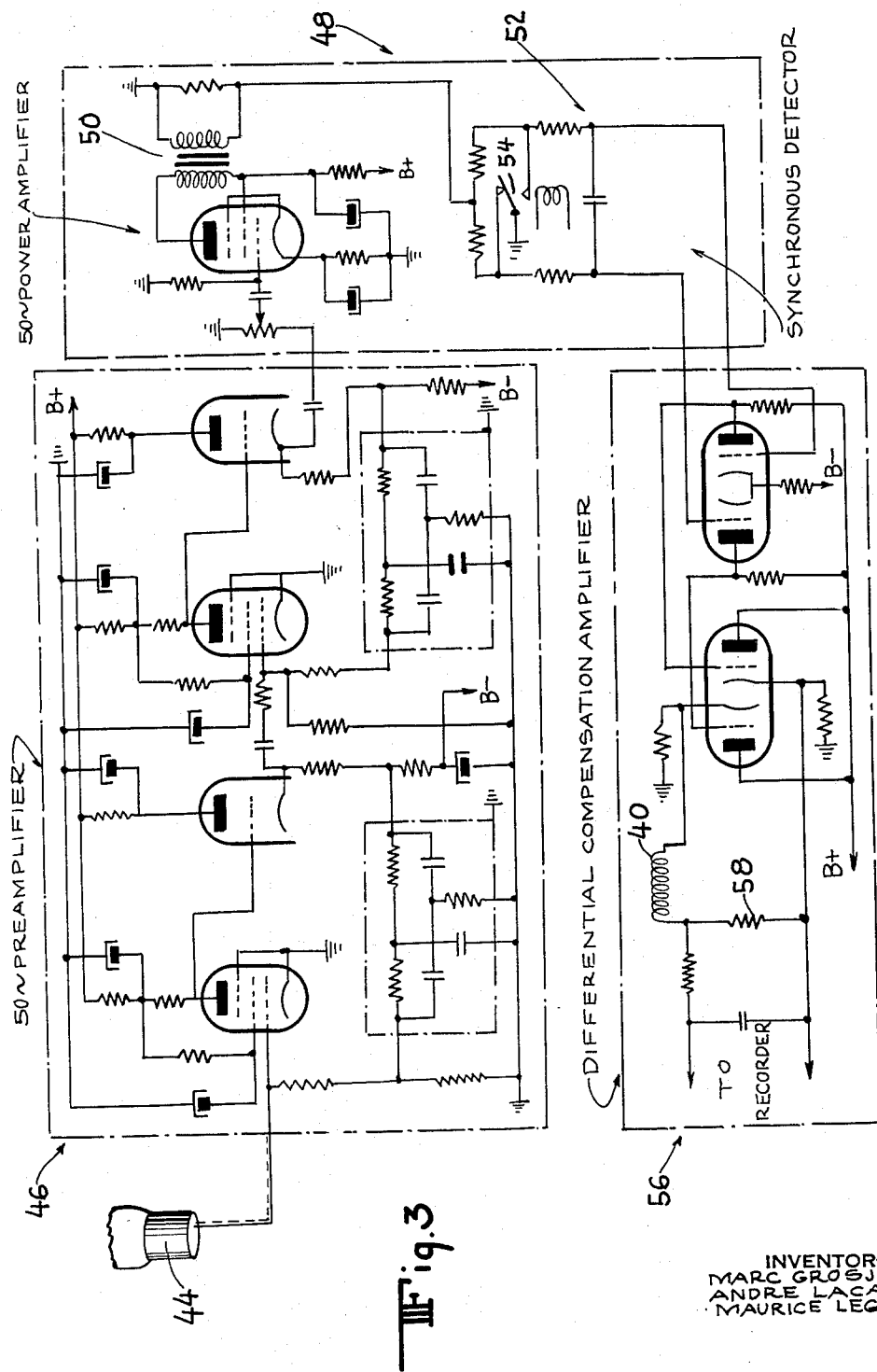

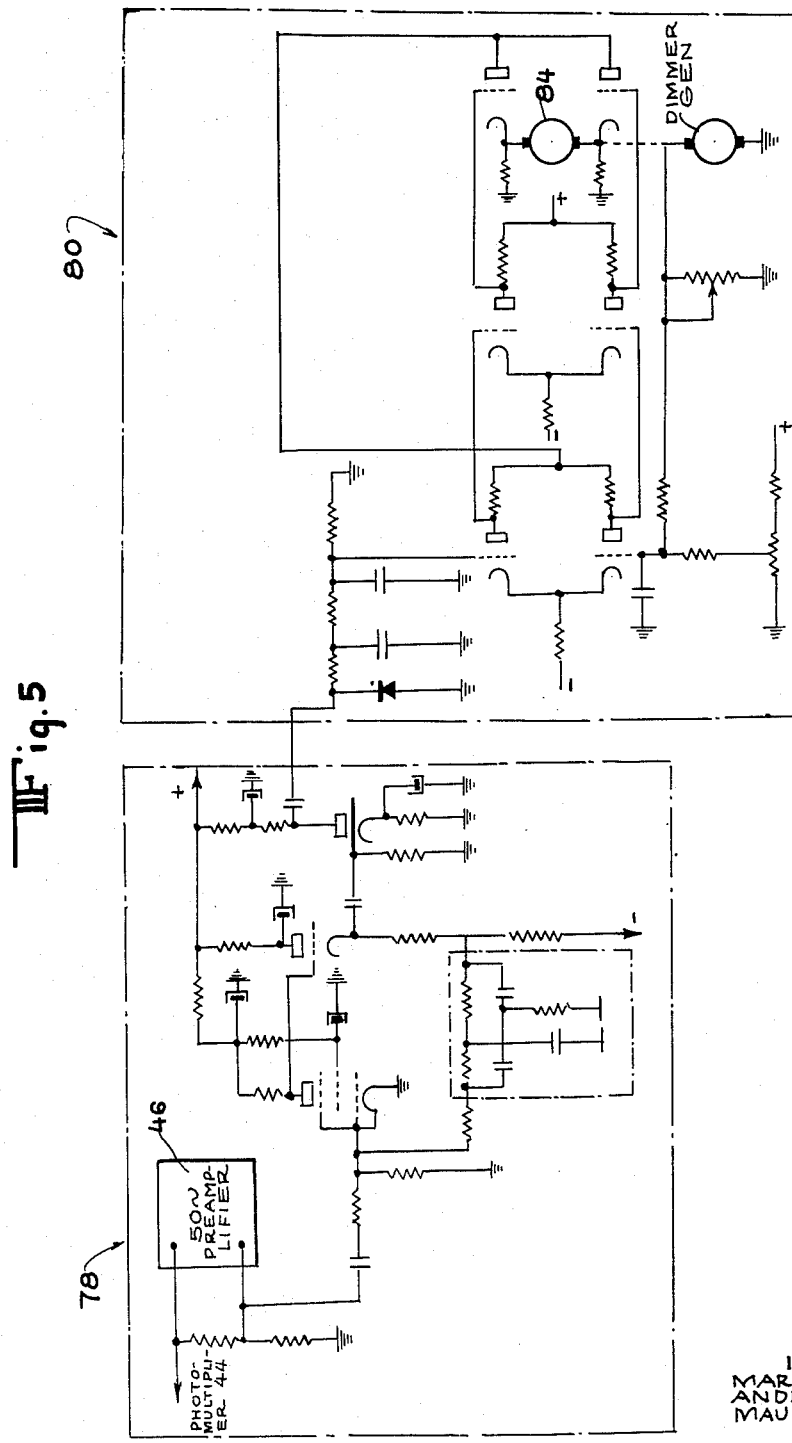

United States Patent Office 3,164,662
Patented Jan. 5, 1965

3,164,662
REGISTERING SPECTRO-POLARIMETER
Marc Grosjean, Paris, Andre Lacam, Chaville, and Maurice Legrand, Paris, France, assignors to Roussel-UCLAF, Societe Anonyme, a corporation of France
Filed July 13, 1960, Ser. No. 42,688
Claims priority, application France, Dec. 18, 1959, 813,474
5 Claims. (Cl. 88—14)

The present invention relates generally to polarimeters and particularly to a registering spectro-polarimeter.

It is an object of the present invention to provide a registering spectro-polarimeter provided with a detection device which makes it possible to directly trace the curve of variations in the rotatory power as a function of the variation in wave lengths of light.

The rotatory dispersion in the visible spectrum, and particularly in the ultra-violet spectrum, has assumed new importance since the work of Djerassi because his method makes it possible, in many instances, to precisely determine the stereo-chemical configuration. However, his development is reduced in value by the experimental difficulties in the determination of the rotatory power at different wave lengths and by the long time that is required for the establishment of a curve.

Consequently, it is another object of the present invention to provide a device which, in one embodiment, makes it possible to record in substantially 10 minutes a spectrum of rotatory dispersion substantially in a range between 2,400 A. and 6,000 A. and which produces a curve which is directly utilizable. Moreover, this power can be extended, and particularly to the range of infra-red wave lengths.

The Gates saccharimeter (Chemistry and Industry, 1958, pages 190 to 193) is already known. It comprises a polarizer or polarizing filter and a current model analyzer which is also a polarizing filter. Provision is made in front of the analyzer for two electromagnetic coils which make it possible to obtain electrically a controlled rotation of the plane of polarization of the light. One of the coils is a modulator which is excited by a sinusoidal magnetic field having a frequency $\Omega$, and the other coil is a compensator which is subjected to a fixed magnetic field. The solution to be analyzed is placed between the two coils and the light leaving the analyzer strikes a photomultiplier.

The applicants have found that in this apparatus, for small angles of rotation and modulation, the voltage V at the exit of the photomultiplier is:

$$V = k\Phi_0(a^2 + (\alpha-\beta)^2 + \frac{\gamma_0^2}{2} + \frac{\gamma_0^2}{2}\cos 2\Omega t + 2(\alpha-\beta)\gamma_0 \cos \Omega t) \quad (1)$$

wherein $\alpha$=angle of rotation of the solution
$\beta$=angle of rotation of the compensator
$\gamma_0$=maximum amplitude of the angle of modulation of the modulator
$\Omega=2\pi f$, the frequency of the modulation voltage
$\Phi_0$=light flux between parallel nicol prisms
$\Phi_0 a^2$=stray light
$k$=coefficient of transformation light flux/output voltage of photomultiplier The alternating frequency component $\Omega$ is electronically separated from the others. It cancels itself in changing phase if $\alpha=\beta$. A feedback system derived from this alternating frequency component $\Omega$ makes it possible to feed into the compensation coil a direct current which tends to maintain the alternating current voltage $\Omega$ constantly zero at the exit of the photomultiplier.

Under these conditions $\alpha$ is at all times equal to $\beta$. Since, moreover, in the Faraday effect, the angle of rotation $\beta$ varies linearly with the magnetic field, hence with the induction current, measurement of the latter makes it possible to deduce the magnitude and sign of the desired angle of rotation. The recording of $\alpha$ is made easy since it is based upon the recording of an electric current.

The apparatus of Gates was constructed with glass optical elements and devised essentially for measuring and recording variations with time of the optical activity of the solutions at a fixed wave length.

Pursuant to the present invention, it is possible to record the spectrum of rotatory dispersion of any solution within a wide range of wave lengths. For this purpose, an important feature of the present invention is that it comprises an optical combination which is transparent to the utilized rays.

Pursuant to one embodiment of the present invention, the optical device comprises a monochromator or monochromatic illuminator having quartz optics, the polarimetric elements being glued with a varnish which is transparent in the spectral range utilized.

Other and additional characteristics and features of the invention will be apparent from the following description, taken in connection with the appended drawings.

In the drawings which illustrate the best mode presently contemplated for carrying out the invention:

FIG. 1 is a more or less schematic and diagrammatic illustration of an apparatus pursuant to the present invention;

FIG. 2 is a fragmentary detail view of the monochromator;

FIG. 3 is a partial circuit diagram of the electronic measuring device pursuant to the present invention;

FIG. 4 is another fragmentary detail view of the monochromator;

FIG. 5 is a circuit diagram of the amplifier for filtering 100 cycle current and of the differential slit amplifier shown in FIG. 1;

Figure 6:
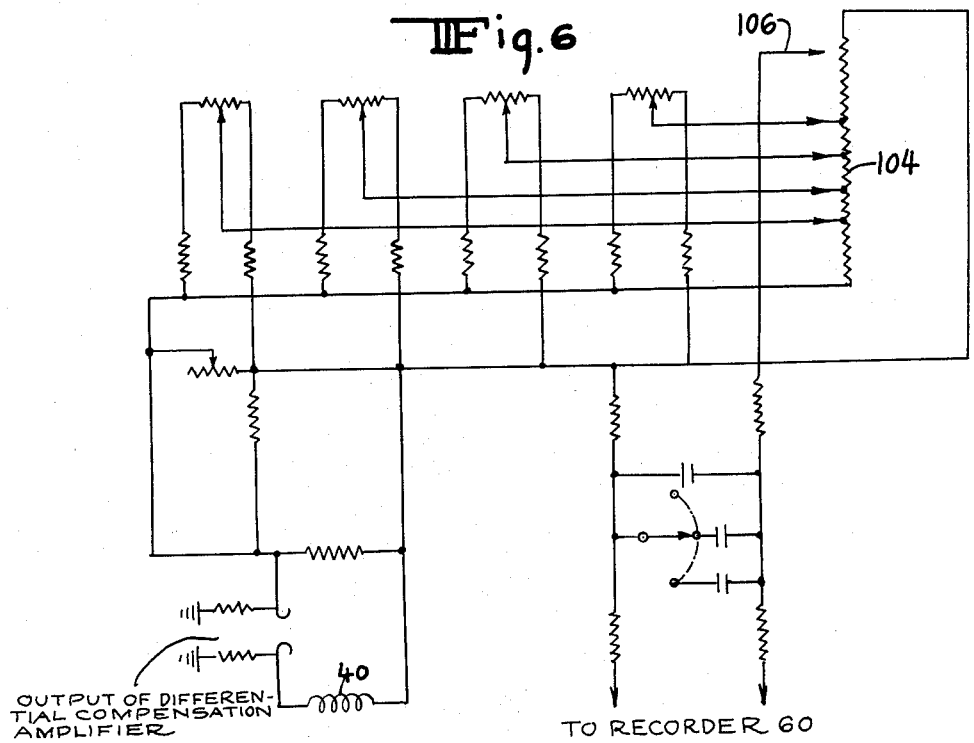
FIG. 6 illustrates the circuit for correcting the Verdet constant.

Referring now to the drawings in detail, FIG. 1 illustrates a registering spectro-polarimeter pursuant to the present invention. The apparatus comprises a light source 12 which consists of a xenon arc under pressure, supplied by a continuous voltage source 14. The light flux is concentrated by lens 16 on the entrance slit 18 of a monochromator or monochromatic illuminator 20 provided with quartz optics. As best shown in FIG. 2, a hole 22 having a diameter of substantially 2 mm. is provided in a diaphragm 24 which is disposed in the plane of the monochromator exit slit. The hole serves as the monochromatic source for the polarimeter, the light passing through a collimator lens 26. The polarimeter comprises a polarizer 28 and an analyzer 30 equipped with glazebrook prisms which are glued together with a varnish which is transparent to ultra-violet light, a cell or container 32 serving as the sample holder, having windows 34 and 36 which are made either of silica glass or of fluorite without birefringence, and a single cell or container 38 filled, for example, with water and placed along the axis of the two self-induction coils 40 and 42. Coil 42 is a modulator which is energized by modulation current having a frequency of 50 cycles per second, and coil 40 is a compensator which is energized by compensation current. In the present case the photomultiplier 44, at the output side of the analyzer, is a Philips 51 UVP cell fed by 1,600 volts.

The total voltage at the output of the photomultiplier 44 is amplified in a selective pre-amplifier 46 which is tuned to the modulation frequency of 50 cycles. The circuit for a suitable pre-amplifier 46 is illustrated in FIG. 3. The illustrated amplifier has an amplification coefficient of 4500, an attenuation of 40 decibels at 100 cycles per second and a hum 50 cycles, output voltage corresponding to an input voltage of substantially 20 microvolts. The output of amplifier 46 is applied to a power amplifier and synchronous detector stage 48. This includes a 50 cycles power amplifier 50, at the output of the pre-amplifier in which the output of amplifier 46 is further amplified and a synchronous detector 52 in circuit with the output of the power amplifier. The synchronous detector is provided with a synchronous symmetrical vibrating relay rectifier 54, which detects the 50 cycles output of the amplifier 50. The relay rectifier is in phase with the modulation current of the modulation coil 42, taking into account the phase displacement introduced by the amplifier stages. It is important that the symmetry of detector 52 is correctly adjusted so as to prevent the detection of a residual frequency component of 100 cycles per second which may have passed through the selective pre-amplifier 46. The rectified and filtered 50 cycles voltage at the output of detector 52, which is proportional to the error between $\alpha$ (the angle of rotation of the solution in container 32) and $\beta$ (the angle of rotation of the compensator), is compared to a null voltage in a differential continuous compensation amplifier 56. The differential voltage acts upon the current traversing the compensating coil 40 in such a way that the 50 cycles component is practically zero at the output of the photomultiplier 44.

The compensation current through coil 40 traverses a stable resistor 58 of relatively low value which is in circuit with the compensation coil 40, and the voltage drop across resistor 58, which is proportional to the angle $\alpha$ of rotation of the solution being considered, is recorded by a suitable conventional recording apparatus 60.

The control shaft 62 of the prism of the monochromator 20 is driven by a small synchronous motor 64 through a geared coupling member 66, whereby the spectrum can be examined according to a known law with respect to time.

Figure 7:
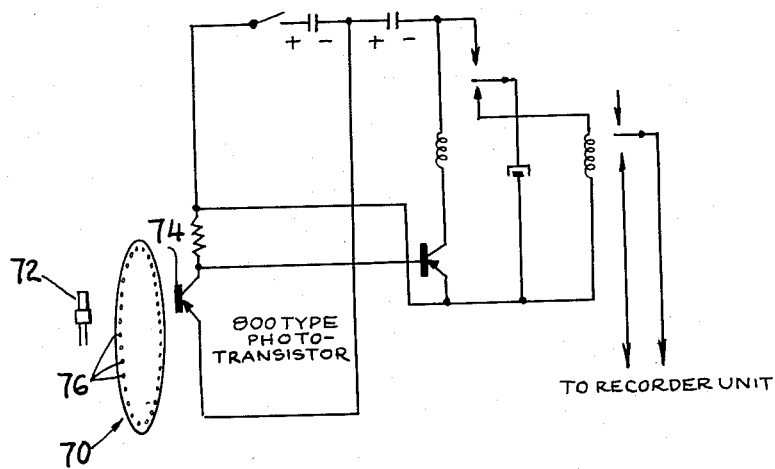
FIG. 7 illustrates the circuit for recording the wave length tops.

Provision is made to facilitate the recording of the spectrum. Since scanning of the spectrum is not linear in wave length with time, the complete wave lengths are recorded on the recorder 68 (FIG. 1.) This is effected by peaks produced by the mechanism shown in FIG. 4 and the circuit shown in FIG. 7. The drive disc 70, mounted on the drive shaft 62 of the monochromator, is interposed between a light source 72 and a phototransistor 74. The disc 70 is provided with perforations 76 which are related to the values of the complete wave lengths. The perforations 76, passing between the light source 72 and the phototransistor 74, provide electrical pulses from the phototransistor, the output of the phototransistor being applied, through the circuit shown in FIG. 7, to the recorder, these pulses being superimposed on the basic signal which, in this case, is the voltage proportional to the angle of rotation $\alpha$. This arrangement facilitates the calibration of the curves.

The important variations of the light flux $\Phi_0$ due to fluctuations in the emission of the source and to the absorption of the solution are automatically compensated so as to maintain the system or "loop gain" at a constant level and at the same time to avoid saturation of the amplifiers. For this purpose the 100 cycles frequency component in the output voltage of the photomultiplier 44, which has an amplitude $$K\Phi_0\frac{\gamma_0^2}{2} \qquad (1)$$

is filtered and rectified in the 100 cycles filter amplifier 78, the circuit of which is shown in FIG. 5. The rectified voltage output of amplifier 78 is applied to a differential amplifier 80 which controls the magnitude of the entrance slit 18 (FIG. 1) and the exit slit 82 (FIG. 2) of the monochromator 20. The rectified voltage output of amplifier 78 is compared with a fixed voltage in the differential amplifier 80. The out-of-balance or error voltage obtained in the differential amplifier 80 is applied to a servomotor 84. The width of entrance slit 18 is controlled by a pair of movable plates on panels 86—86 and the width of exit slit 82 is controlled by a pair of movable plates or panels 88—88, all of which are movable, as indicated by arrows 90 in FIG. 2 in the case of plates 88. Movement of each set of the respective plates is effected by a pair of gears 92—92 which are in mesh with each other and each of which is in mesh with one of the plates. One of the gears 92 is in mesh with a gear 94 mounted on a shaft 96. Shaft 96 is driven by an endless belt 98 which rides on a drive wheel 100 driven by a shaft 102 operated by the servomotor 84. The error voltage applied to the servomotor operates the latter in such a manner as to compensate the variations of $$K\Phi_0\frac{\gamma_0^2}{2}$$

The recording does not make it possible to read the angle $\alpha$ directly, because the Verdet constant of water has a certain dispersion. In order to avoid having to recalculate the curve, this correction is made automatically by dividing the voltage corresponding to the compensation current $i$ of compensation amplifier 56 with a shunt potentiometer 104 (FIGS. 4 and 6). As best shown in FIG. 6, potentiometer 104 is of the helical type and has a sliding arm or contact 106 (FIG. 6) which is keyed to the control shaft 62 of the dispersing system of the monochromator. Thus, it suffices to correct the shunting in such a way as to reproduce the law of dispersion of the Verdet constant.

The filtering preamplifier 46 lets the alternating 50-cycles component of the overall signal pass. This component comprises the useful signal, that is in phase with the modulation current of the modulation coil 42, plus the fraction of the background noise of the coil whose frequency is in the neighborhood of 50 cycles but whose phase is very variable over a period of time with respect to the modulation coil.

In order to make use of this phenomenon, the 50-cycles signal is detected with the synchronous detector 54 which is in phase with the modulation coil and whose function is to rectify only those signals which have not only a frequency very near 50 cycles but also a phase only slightly different from the reference signal.

With the aid of this system, the disturbing action of the background noise, which would limit the sensitivity of the system by interfering with the useful signal, is minimized.

The embodiment described up to this point is an apparatus especially adapted for the range of wave lengths situated between 2,500 and 6,000 A. In accordance with a modification, the apparatus can be adapted to function with greater wave lengths situated in the infra-red range. For this purpose, and for wave lengths less than 2.5 microns, the detector 44 is replaced by an element which is sensitive in the range of investigation, such as infra-red photomultipliers, thermocouples, lead sulfide cells, lead telluride cells, etc., the described optical device remaining conveniently within the above-indicated range.

One variation consists of utilizing quartz polarizing systems (Rochon, Wallaston, etc.) which make it possible to extend the range still further into the ultraviolet spectrum.

Another modification of the device, within the scope of the present invention, consists of substituting for the cell 32 previously used a circulating liquid cell (a device well known to those skilled in the art). Under these conditions, it is possible to follow the differences in behavior of the examined liquids, and this at wave lengths for which the phenomenon is most apparent. It is also evident that phenomenon may be examined with respect to the time, at a fixed wave length, by blocking the monochromator on that wave length.

The apparatus according to the present invention, in comparison with the arrangement briefly outlined by Billardon and Badoz (C.R. Acad. Sci., 1959, 248, page 2466), offers the advantages of recording and of a much more extended range of spectral exploration.

While we have shown and described the presently preferred embodiments of our invention, it will be understood that it is capable of many modifications and that changes may be made in the construction and arrangement thereof without departing from the spirit and scope of the invention as disclosed in the appended claims.

We claim:

1. A recording spectro-polarimeter for recording the curve of variation of the rotary power of an optically active material as a function of the wave-length, comprising the combination of (1) an optical system having a single beam optical path comprising a light source emitting light in a broad spectrum of wave-lengths at one end of said path and photoelectric light-receiving means at the opposite end of said path adapted to ultimately receive light from said optical system and convert the same into an electrical signal, monochromator means inserted in said path for receiving the light from said source and including means to continuously vary the wave-length of the monochromatic light beam issuing therefrom so as to scan said broad spectrum of wave-lengths, polarizer means for receiving said monochromatic light beam for imparting thereto a fixed plane of polarization, means for holding a sample of the said optically active material in the path of said plane polarized monochromatic beam so as to vary the plane of polarization from the rotation imparted by said sample to said monochromatic plane polarized beam, means utilizing the Faraday effect for modulating the plane of polarization of said beam issuing from said sample to impart to said plane of polarization an alternating cyclical variation at predetermined phase and frequency, said means also including further means utilizing the Faraday effect to compensate for the said modulation effect, and analyzer optical means inserted between the output of said modulating means and said photoelectric light-receiving means, (2) and of means for detecting that part only of the said electrical signal which has the same phase and frequency as those of the said modulating means, means coupled to said monochromator for connecting said detected part of the electrical signal to said modulation compensating means, (3) and of a recorder, having two directions of displacement, means coupled to said monochromator for controlling one direction of displacement of said recorder as a function of the variation of wave-length from said monochromator means, and means coupled to said detecting means for controlling the other direction of displacement of said recorder as a function of the variation of said detected part of the electrical signal.

2. A recording spectro-polarimeter for recording the curve of variation of the rotary power of an optically active material as a function of the wave-length, comprising the combination of (1) an optical system having a single mean optical path comprising a light source emitting light in a broad spectrum of wave lengths at one end of said path and photo-electric light-receiving means at the opposite end of said path adapted to ultimately receive light from said optical system and convert the same into an electrical signal, monochromator means inserted in said path and for receiving the light from said source and including means to continuously vary the wave-length of the monochromatic light beam issuing therefrom so as to scan said broad spectrum of wave-lengths, polarizer means for receiving said monochromatic light beam and for imparting thereto a fixed plane of polarization, means for holding a sample of the said optically active material in the path of said plane polarized monochromatic beam so as to vary the plane of polarization from the rotation imparted by said sample of said monochromatic planar polarized beam, means utilizing the Faraday effect for modulating the plane of polarization of said beam issuing from said sample to impart to said plane of polarization an alternating cyclical variation at predetermined phase and frequency, said means also including further means utilizing the Faraday effect to compensate for the said modulation effect, and analyzer optical means inserted between the output of said modulating means and said photoelectric light-receiving means, (2) and of means for detecting that part only of the said electrical signal which has the same phase and frequency as those of the said modulating means, means coupled to said detecting means for applying said detected part of the electrical signal to said modulation compensating means, (3) and of a recorder, having two directions of displacement, means coupled to said monochromator for controlling one direction of displacement of said recorder as a function of the variation of wave-length from said monochromator means, and means coupled to said detecting means for controlling the other direction of displacement of said recorder as a function of the variation of said detected part of the electrical signal, said monochromator means comprising a dispersing system and a control shaft therefor, and means for marking the whole wave lengths on the recording, said marking means comprising a perforated disk provided on the control shaft of said dispersing system of the monochromator, a light source at one side of said disk, a phototransistor at the other side of said disk, said perforations being related to the whole wave-length values, and means for applying the output signals of said phototransistor to the recording.

3. A recording spectro-polarimeter for recording the curve of variation of the rotary power of an optically active material as a function of the wave-length and utilizing the Verdet constant, comprising the combination of (1) an optical system having a single beam optical path comprising a light source emitting light in a broad spectrum of wave-lengths at one end of said path and photoelectric light-receiving means at the opposite end of said path adapted to ultimately receive light from said optical system and convert the same into an electrical signal, monochromator means inserted in said path for receiving the light from said source and including means to continuously vary the wave-length of the monochromatic light beam issuing therefrom so as to scan said broad spectrum of wavelengths, polarizer means for receiving said monochromatic light beam and for imparting thereto a fixed plane of polarization, means for holding a sample of the said optically active material in the path of said plane polarized monochromatic beam so as to vary the plane of polarization from the rotation imparted by said sample to said monochromatic plane polarized beam, means utilizing the Faraday effect for modulating the plane of polarization of said beam issuing from said sample to impart to said plane of polarization an alternating cyclical variation at predetermined phase and frequency, said means also including further means utilizing the Faraday effect to compensate for the said modulation effect, and analyzer optical means inserted between the output of said modulating means and said photoelectric light-receiving means, (2) and of means for detecting that part only of the said electrical signal which has the same phase and frequency as those of the said modulating means, means coupled to said detecting means for applying said detected part of the electrical signal to said modulation compensating means, (3) and of a recorder, having two directions of displacement, means coupled to said monochromator for controlling one direction of displacement of said recorder as a function of the variation of wave-length from said monochromator means, and means coupled to said detecting means for controlling the other direction of displacement of said recorder as a function of the variation of said detected part of the electrical signal, said monochromator comprising a dispersing system and a control shaft therefor, said means applying said detected part of the electrical signal to said modulation compensating means including a shunt potentiometer having a slider, and means for controlling the slider of said potentiometer from the said dispersing shaft so as to automatically correct the dispersion of the Verdet constant as a function of the wave-length.

4. A recording spectro-polarimeter for recording the curve of variation of the rotary power of an optically active material as a function of the wave-length, comprising the combination of (1) an optical system having a single mean optical path comprising a light source emitting light in a broad spectrum of wave-lengths at one end of said path and photoelectric light-receiving means at the opposite end of said path adapted to ultimately receive light from said optical system and convert the same into an electrical signal, monochromator means inserted in said path for receiving the light from said source and including means to continuously vary the wave-length of the monochromatic light beam issuing therefrom so as to scan said broad spectrum of wavelengths, polarizer means for receiving said monochromatic light beam and for imparting thereto a fixed plane of polarization, means for holding a sample of the said optically active material in the path of said plane polarized monochromatic beam so as to vary the plane of polarization from the rotation imparted by said sample to said monochromatic plane polarized beam, means utilizing the Faraday effect for modulating the plane of polarization of said beam issuing from said sample to impart to said plane of polarization an alternating cyclical variation at predetermined phase and frequency, said means also including further means utilizing the Faraday effect to compensate for the said modulation effect, and analyzer optical means inserted between the output of said modulating means and said photoelectric light-receiving means, (2) and of means for detecting that part only of the said electrical signal which has the same phase and frequency as those of the said modulating means, means coupled to said detecting means for applying said detected part of the electrical signal to said modulation compensating means, (3) and of a recorder, having two directions of displacement, means coupled to said monochromator for controlling one direction of displacement of said recorder as a function of the variation of wave-length from said monochromator means, and means coupled to said detecting means for controlling the other direction of displacement of said recorder as a function of the variation of said detected part of the electrical signal, said monochromator being provided with controllable entrance and exit slits, means for filtering out and rectifying in the said electrical signal a component of twice the frequency of the said modulating means, existing in said signal, and means for controlling the openings of said variable entrance and exit slits of said monochromator means from the variation of value of said component of twice frequency of said modulating means.

5. A recording spectro-polarimeter for recording the curve of variation of the rotary power of an optically active material as a function of the wave-length and utilizing the Verdet constant, comprising the combination of (1) an optical system having a single beam optical path comprising a light source emitting light in a broad spectrum of wave-lengths at one end of said path and photoelectric light-receiving means at the opposite end of said path adapted to ultimately receive light from said optical system and convert the same into an electrical signal, monochromator means inserted in said path for receiving the light from said source and including means to continuously vary the wave-length of the monochromatic light beam issuing therefrom so as to scan said broad spectrum of wavelengths, polarizer means for receiving said monochromatic light beam and for imparting thereto a fixed plane of polarization, means for holding a sample of the said optically active material in the path of said plane polarized monochromatic beam so as to vary the plane of polarization from the rotation imparted by said sample to said monochromatic plane polarized beam, means utilizing the Faraday effect for modulating the plane of polarization of said beam issuing from said sample to impart to said plane of polarization an alternating cyclical variation at predetermined phase and frequency, said means also including further means utilizing the Faraday effect to compensate for the said modulation effect, and analyzer optical means inserted between the output of said modulating means and said photoelectric light-receiving means, (2) and of means for detecting that part only of the said electrical signal which has the same phase and frequency as those of the said modulating means, means coupled to said detecting means for applying said detected part of the electrical signal to said modulation compensating means, (3) and of a recorder, having two directions of displacement, means coupled to said monochromator means for controlling one direction of displacement of said recorder as a function of the variation of wave-length from said monochromator means, and means coupled to said detecting means for controlling the other direction of displacement of said recorder as a function of the variation of said detected part of the electrical signal, said monochromator means comprising a dispersing system and a control shaft therefor, and means for marking the whole wave-lengths on the recording, said marking means comprising a perforated disk provided on the control shaft of said dispersing system of the monochromator, a light source at one side of said disk, a phototransistor at the other side of said disk, said perforations being related to the whole wave-length values, and means for applying the output signals of said phototransistor to the recording, said means applying said detected part of the electrical signal to said modulation compensating means including a shunt potentiometer having a slider, and means for controlling the slider of said potentiometer from the said dispersing shaft so as to automatically correct the dispersion of the Verdet constant as a function of the wave-length, said monochromator being provided with controllable entrance and exit slits, means for filtering out and rectifying in the said electrical signal a component of twice the frequency of the said modulating means, existing in said signal, and means for controlling the openings of said variable entrance and exit slits of said monochromator means from the variation of value of said component of twice frequency of said modulating means.

References Cited by the Examiner

UNITED STATES PATENTS

| 1,894,132 | 1/33 | Stone | 88—14 |
| 2,768,306 | 10/56 | Grubb et al. | 88—14 |
| 2,933,972 | 4/60 | Wenking | 88—14 |
| 2,974,561 | 3/61 | Hardy et al. | 88—14 |
| 2,984,149 | 5/61 | Herscher et al. | 88—14 |

OTHER REFERENCES

Brode et al.: "A Recording Spectrophotometer and Spectropolarimeter," Journal of the Optical Society of America, volume 31, No. 12, December 1941, pp. 743–749.

JEWELL H. PEDERSEN, *Primary Examiner.*

EMIL G. ANDERSON, *Examiner.*